UNITED STATES PATENT OFFICE.

JOHN WOODS BECKMAN, OF NIAGARA FALLS, CANADA, ASSIGNOR TO AMERICAN CYANAMID COMPANY, OF NEW YORK, N. Y., A CORPORATION OF MAINE.

PROCESS OF MAKING A CONTACT MASS.

1,007,516.  Specification of Letters Patent.  Patented Oct. 31, 1911.

No Drawing.  Application filed December 14, 1909. Serial No. 533,094.

*To all whom it may concern:*

Be it known that I, JOHN WOODS BECKMAN, a subject of the King of Sweden, residing at Niagara Falls, in the Dominion of Canada, have invented certain new and useful Improvements in Contact Masses and Processes of Making the Same; and I do hereby declare the following to be a full, clear, and exact description of the invention, such as will enable others skilled in the art to which it appertains to make and use the same.

This invention relates to a contact mass and process of making the same and has for its object to produce a material which will facilitate the extraction of nitrogen from the air.

With this and other objects in view the invention consists in the novel composition of matter and process for producing the same, more fully hereinafter disclosed and particularly pointed out in the claim.

In carrying out this invention, I preferably take a mixture of finely divided copper oxid, silica, and of granular alumina and so proportion them that a very small quantity of silica will, upon heating, chemically combine with its equivalent of copper oxid to form a bonding material which binds the aluminum oxid and the excess of copper oxid together; but this binder is in such a small quantity that it does not materially decrease the porosity of the resulting granular mass. The heating of the material is mainly for the purpose of fusing the copper oxid, and therefore the upper limit of temperature should not be above the boiling point of the said oxid. In practice I have found that it is advantageous to not heat the material above 1200° C., for otherwise the copper oxid becomes too fluid, and is liable to run off the upper strata of the mass. The lower limit of temperature is that degree at which the copper oxid will become sufficiently fluid to coat the granules, and this may be determined by inspection.

In practice the mixed oxids with a very small quantity of silica are heated to a temperature above the melting point of copper or above 1200° C. in any suitable furnace, when the silicate bonding material is formed, while the copper oxid in excess is melted and diffuses together with the reduced copper throughout the whole mass and coats the individual grains. Therefore the mass which is found upon cooling to be open and porous is solidly bound together and has each of its grains covered with a coating of copper oxid or copper. The thickness of the copper film will depend upon the percentage of copper originally selected and it may, therefore, be varied to suit specific requirements.

As an illustration of the process the following specific example is cited:—Take 40 pounds of fused granular aluminum oxid, or alundum; 9 pounds of finely divided copper oxid; and .7 (seven tenths) of a pound of powdered silica. The aluminum oxid may be of any sized grain, but I prefer one that will pass through a 14 or a 16 mesh sieve. The copper oxid, as well as the silica, are preferably ground so fine that they will pass through a one hundred mesh sieve, although this is not essential. The constituents may be thoroughly mixed conveniently in a graphite crucible and heated for five hours at a temperature higher than the melting point of copper, when after being taken out they will be found to be firmly bound together in an open porous mass offering no appreciable resistance to the passage of air therethrough and each grain will be coated with a film of copper oxid, or of copper matte, or of metallic copper. If this porous mass is next heated to the requisite temperature in a suitable closed vessel, and any suitable reducing gas such as hydrogen, methane, carbon monoxid or producer gas, or any mixture of these, be passed through the same, substantially all the copper oxid will be reduced to copper, and each grain will be found to be coated with a film of metallic copper. The degree of heat necessary for this reduction is readily ascertained by gradually raising the temperature of the mass until metallic copper is observed. If air is next passed through the heated porous mass at a slightly lower temperature and which now has a very large copper coated surface, the copper will take up the oxygen from the air to reform the copper oxid, and nitrogen substantially free from oxygen will pass through and may be recovered. The copper oxid films formed by the passage of air through the porous mass may next be reduced to metallic copper in the manner above disclosed and the operation repeated indefinitely.

It is obvious that instead of pure alumina, other materials containing alumina, such as corundum, emery, and garnet may be used, without materially reducing the efficiency of the process. It is also evident that the oxids of other metals than copper may be reduced by this process and that if the recovery of nitrogen free from oxygen is desired, iron oxids may be freely substituted for copper oxids. And in such cases the mass is heated to that temperature at which it is observed the iron oxid will flow freely over the individual grains. This temperature is probably about 1300° C. to 1400° C., if the double oxid $Fe_3O_4$ is employed. It is likewise evident that other refractory materials may be used in the place of the alumina products, for example magnesite, chrome ore, etc.

In addition to the above, it is apparent that this porous mass and process may be used in arts very different from that of recovering nitrogen from the air. In fact, a porous mass having a large copper coated surface could be usefully employed as a catalytic element in the contact process of making sulfuric acid, and in other catalytic or chemical processes. Therefore, since it is evident that those skilled in the art may widely vary my product and process for producing the same without departing from the spirit of my invention, I do not wish to be limited to the above disclosure except as may be required by the claim.

What I claim is:—

The process of making a porous contact mass having the surfaces of its pores coated with films containing copper, which consists in mixing suitable proportions of finely powdered silica and copper oxid with granular alumina, and in heating the mixture to a temperature above the melting point of copper to permit the silica to react with a portion of the copper oxid and to cause the excess of the latter to coat the individual particles of the aluminum oxid, substantially as described.

In testimony whereof, I affix my signature, in presence of two witnesses.

JOHN WOODS BECKMAN.

Witnesses:
FREDERICK CHORMANN,
GEORGE MULLANE.